Feb. 16, 1937.　　　　P. E. STONE　　　　2,070,692
LOCK
Filed June 21, 1935
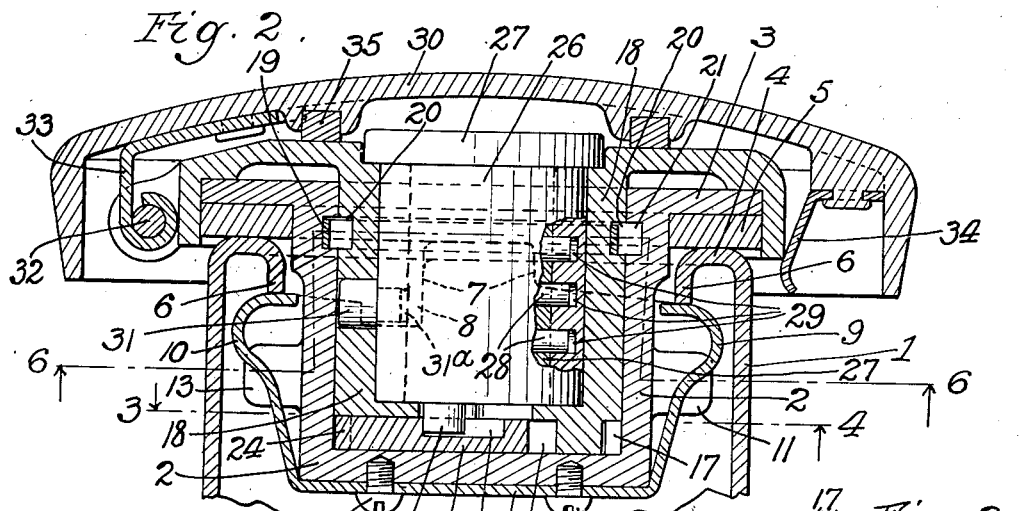
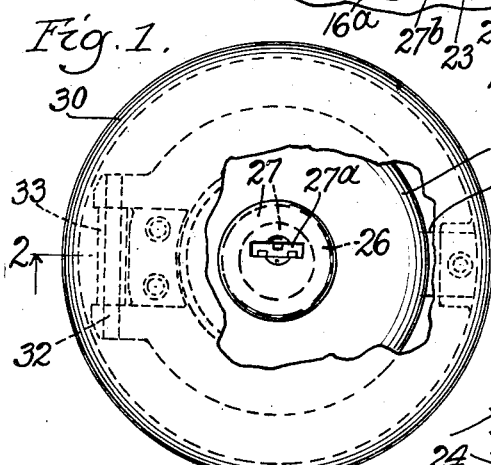
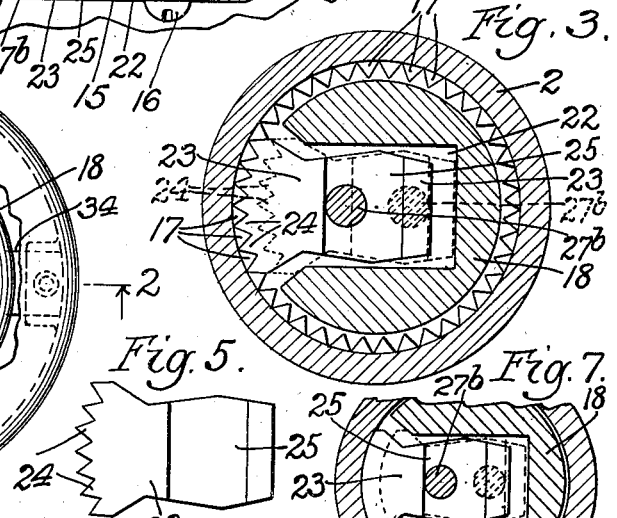
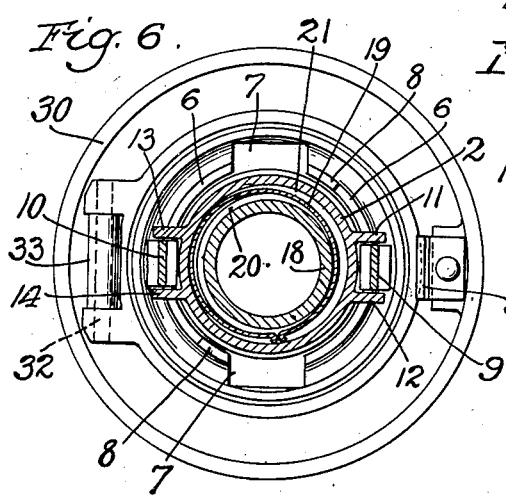
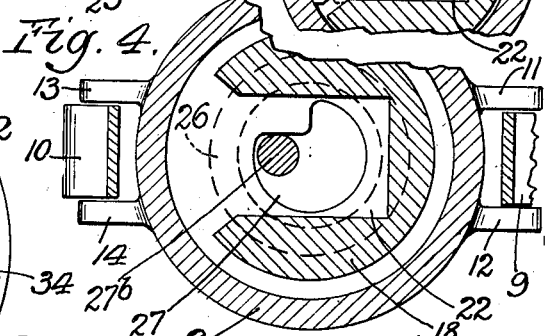
Inventor
Porter E. Stone
by Parker & Carter
Attorneys.

Patented Feb. 16, 1937

2,070,692

UNITED STATES PATENT OFFICE 2,070,692

LOCK

Porter E. Stone, Detroit, Mich.

Application June 21, 1935, Serial No. 27,668

10 Claims. (Cl. 70—165)

This invention relates to locks and has for its object to provide a new and improved device of this description. The invention has as a further object to provide a lock of the free wheeling type. The invention has further objects which are more particularly pointed out in the accompanying description.

Referring now to the drawing, Fig. 1 is a top view with parts broken away showing one form of lock;

Fig. 2 is an enlarged sectional view taken on line 2—2 of Fig. 1;

Fig. 3 is a sectional view taken on line 3—4 of Fig. 2 looking downwardly;

Fig. 4 is a sectional view taken on line 3—4 of Fig. 2 looking upwardly;

Fig. 5 is a plan view of the movable locking member;

Fig. 6 is a sectional view taken on line 6—6 of Fig. 2 with the lock barrel omitted, and Fig. 7 is a view similar to Fig. 3 showing a modified construction, and with parts broken away.

Like numerals refer to like parts throughout the several figures.

For purposes of illustration, the lock is shown in connection with a gasoline tank for locking the cap in position, although it may be used for any other suitable purpose where a lock is desired.

Referring now to the drawing, there is illustrated the portion 1 of the gasoline tank having the opening through which gasoline is inserted. Located within this opening, when it is desired to close it, is a locking member 2 having an annular rim 3 which fits over the edge 4 of the portion of the tank surrounding the opening. There is preferably a washer 5 between the shoulder 3 and the part 4. The part 4 has an inwardly bent portion 6 which acts as a stationary fastening member and which is cut away at 7 at opposite sides and which is provided with projections 8 which act as a stop. Attached to the casing 2 are the movable fastening members 9 and 10 which engage the under face of the stationary fastening member 6 and which are arranged between the guiding members 11 and 12, 13 and 14. The movable locking members 9 and 10 may be formed in any desired manner, and a simple way of forming them is to form them integral so that they are connected together by the bottom portion 15 which is attached to the casing by the fastening devices 16 and 16a. The locking member 2 is provided at its bottom portion, and preferably extending therearound, with a series of teeth 17. Located within the casing is the rotatable member 18 which is also hollow. A spring ring 19 extends around a groove 20 in the rotatable member 18 and there is a corresponding groove 21 in the casing. The bottom of the rotatable member 18 is cut away at 22 to receive the movable locking member 23 which is provided with teeth 24, which engage the teeth 17a on the interior of the member 2. This movable locking member 23 is provided with a groove 25 extending thereacross. Located within the rotatable member 18 is a cylinder 26 and within this cylinder is the barrel 27, having a keyhole 27a.

When the key is not in the barrel 27, the barrel 27 is locked to the cylinder 26 by the bolts 28 which seat in the recesses 29 in the cylinder, and the barrel 27, the cylinder 26, the member 18 and the cover 30 rotate freely in the member 2, that is they have a free wheeling action, this member 2 remaining stationary so that the fastening members 9 and 10 remain in their fastening position, so that the device cannot be unlocked or opened. The spring 19 prevents the withdrawal of the member 18 from the member 2. The cylinder 26 and the member 18 are connected together by a connecting member 31 which projects into a recess 31a in the cylinder 26. This connecting member causes the cylinder 26 and the member 18 to rotate together and also prevents the withdrawal of the cylinder 26 from the member 18.

When the key is inserted in the barrel 27 (cover 30 having first been swung open about hinge 32, 33) it withdraws the bolts 28 from the recesses 29 and unlocks the barrel 27 from the cylinder 26. The barrel 27 may be then moved separate from the other parts. During this movement the projection 27b in the slot 25 of the locking member 23 moves said locking member from the position shown in dotted lines in Fig. 3 to the position shown in full lines in said figure, causing the teeth 24 to engage the teeth 17 on the member 2. The barrel 27, the cylinder 26, the member 18 and the member 2 are now locked together, and a further rotation of the key moves the locking members 9 and 10 around to the cutaway portions 7, or the operator can grasp cover 30 or member 18 and upon turning either of these members the member 2 will also turn and the locking fingers 9 and 10 can be turned around to the slots 7, whereupon the entire lock can be lifted and moved out of the filler tube 1 to open up the gasoline tank or to open any other device with which the lock is used. The cover 30 is attached to the locking member 2 by the hinge 32, 33. This cover has a spring catch 34, which normally holds it in its closed position. There is preferably a washer 35 between the cover 30 and the top of the member 18.

When it is desired to lock the device the parts are moved into position in the part 1 and rotated to bring the locking members 9 and 10 under the part 6, and preferably until engaging the projections 8, which stops the further movement in this direction. The key is now withdrawn and the parts are locked in position.

The angle of the engaging faces of the teeth 24 on the locking member 23 and the teeth 17a on the member 2 are such as to produce interlocking action between them so that the harder they are pressed together, the more tightly they are locked to each other. This locking action is increased by the tilting of the locking member 23 as the parts are tightened. As described above, the lock bolt 23 has a loose fit in the guideway 22 formed in the rotatable member 18, consequently the bolt 22 can tilt or cant in the guideway 22. When the bolt 23 is projected by the pin 27b into interengagement with the teeth 17 on the member 2, any relative rotation between the member 2 and the member 18 will cause the bolt 23 to tilt or cant in guideway 22 and when the inclined side 53 of the bolt engages the inclined face or flared mouth 54 of the guideway 22 in the member 18, the bolt 22 is cammed or urged outwardly toward teeth 17 to more securely bind or lock the members 18 and 2 together. Hence, the interlocking action between the bolt 23 and the member 2 is what may be termed "self-energizing" because the harder one tries to turn the member 18 relative to the member 2 the more tightly the bolt 23 interengages the member 2. In fact, when the bolt is projected and the cam faces 53 and 54 engage, any torque applied to the cover member 30 or cap 18 will be transmitted through cam face 54 to face 53 and cam the bolt 23 more tightly into engagement with the teeth 17 or inside face 55 of the member 2. This action substantially relieves the pin 27b of any load or thrust as the cap is turned on to the filler tube 1 to interengage the locking lugs 9 with the cooperating locking portions 6 on the filler tube 1 or when the reverse rotation takes place in the removing of the cap from the filler tube 1. In Fig. 7 I have shown a modified construction where the teeth are omitted from the locking member 23 and the member 2, the member 23 simply having a curved face which engages the curved inner face of the member 18. The tilting of the member 23 causes such a binding action as to produce sufficient locking action to cause the member 2 to rotate.

In the modified construction where the teeth are omitted a similar self-energizing or binding action (such as described above) occurs when the bolt 23 is projected and relative rotation occurs between the member 2 and the member 18. Here, as in the principal form of the invention, the engagement of cam face 54 with face 53 sets up a certain component of force which drives the bolt 23 outwardly into frictionally binding engagement with face 55 of member 2.

I have described in detail the particular structure embodied in the invention, but it is of course evident that the parts may be varied in many particulars and parts omitted and other parts added, without departing from the spirit of the invention as embodied in the claims hereto appended. It is further evident that the lock may be used with the proper changes in connection with any other device than an automobile gasoline tank.

I claim:

1. In combination with two members one of which is relatively rotatable within the other, a key controlled reciprocable bolt between the said members, a guideway in one of the said members in which the bolt is loosely guided and cantable whereby when the bolt is projected to interlock the said members the canting action of the bolt creates a resistance to the relative rotation of the said members, which resistance increases as the force tending to move one member relative to the other increases.

2. In combination with two members one of which is relatively rotatable within the other, a reciprocable bolt, a radial guideway in one of the said members in which the bolt reciprocates and is loosely guided to permit tilting of the bolt, a key controlled cylinder lock journalled in one of the said members and having an eccentric pin for projecting the said bolt radially outwardly into engagement with the other of said rotatable members whereby when the bolt is projected into locking engagement with one of the said members, the canting of the bolt in said guideway causes the locking action to increase as the force tending to move one member relative to the other increases and the pin is relieved of substantially all load to prevent shearing.

3. In combination with two members one of which is relatively rotatable within the other, a reciprocable bolt, a guideway in one of said members in which the bolt reciprocates and is loosely guided to permit canting of the bolt in the guideway, a key controlled cylinder lock journalled in one of said members and having an eccentric pin for projecting the bolt outwardly along the guideway into engagement with the other of said rotatable members to lock the said members together, and cooperating cam surfaces on the said bolt and one of the said members, which cam surfaces engage when the bolt is projected whereby when one of the said members is rotated the torque is transmitted through the said cam surfaces and bolt from one rotatable member to the other.

4. In combination with two members one of which is relatively rotatable within the other, a reciprocable bolt, a guideway in one of said members in which the bolt reciprocates and is loosely guided to permit canting of the bolt in the guideway, a key controlled cylinder lock journalled in one of said members and having an eccentric pin for projecting the bolt outwardly along the guideway into engagement with the other of said rotatable members to lock the said members together, a cam face on the bolt and a cam face on one of the rotatable members which, when the bolt is projected, cooperate with the tilting action of the bolt to increase the resistance to relative rotation of the two members as the force tending to rotate the one about the other increases.

5. In combination with two members one of which is relatively rotatable within the other, a reciprocable bolt, a guideway in one of said members in which the bolt reciprocates and is loosely guided to permit canting of the bolt in the guideway, a key controlled cylinder lock journalled in one of said members and having an eccentric pin for projecting the bolt outwardly along the guideway into engagement with the other of said rotatable members to lock the said members together, a cam face on the bolt and a cam face at the mouth of the said guideway, the said cam faces, when the bolt is projected, cooperating to urge the bolt outwardly with a locking pressure which increases as the force tending to rotate the one member about the other increases.

6. In combination with two members one of which is relatively rotatable within the other, a reciprocable bolt, a guideway in one of said members in which the bolt reciprocates and is loosely guided to permit canting of the bolt in the guideway, a key controlled cylinder lock journalled in one of said members and having an eccentric pin for projecting the bolt outwardly along the guideway into engagement with the other of said rotatable members to lock the said members together, a cam face on the bolt and a cam face at the mouth of the said guideway, the said cam faces extending at an angle to the longitudinal axis of the said bolt and guideway and cooperating when the bolt is projected to urge the bolt outwardly with a locking pressure which increases as the force tending to rotate the one member about the other increases.

7. In combination with two members one of which is relatively rotatable within the other, a reciprocable bolt, a guideway in one of said members in which the bolt reciprocates and is loosely guided to permit canting of the bolt in the guideway, the end of the bolt and one of the said rotatable members having mutually engageable concentric locking surfaces, a key controlled cylinder lock journalled in one of said members and having an eccentric pin for projecting the bolt outwardly along the guideway to engage the locking surfaces of said bolt and the other of said rotatable members to lock the said members together, a cam face on the bolt and a cam face on one of the rotatable members which, when the bolt is projected, cooperate with the tilting action of the bolt to increase the resistance to relative rotation of the two members as the force tending to rotate the one about the other increases.

8. In combination with two members one of which is relatively rotatable within the other, a reciprocable bolt, a guideway in one of said members in which the bolt reciprocates and is loosely guided to permit canting of the bolt in the guideway, the end of the bolt and one of the said rotatable members having mutually engageable concentric locking surfaces, the said locking surfaces having interengageable teeth, a key controlled cylinder lock journalled in one of said members and having an eccentric pin for projecting the bolt outwardly along the guideway into engagement with the other of said rotatable members to lock the said members together, a cam face on the bolt and a cam face on one of the rotatable members which, when the bolt is projected, cooperate with the tilting action of the bolt to increase the resistance to relative rotation of the two members as the force tending to rotate the one about the other increases.

9. In combination with two members one of which is relatively rotatable within the other, a reciprocable bolt, a guideway in one of said members in which the bolt reciprocates and is loosely guided to permit canting of the bolt in the guideway, means for projecting the bolt outwardly along the guideway into engagement with the other of said rotatable members to lock the said members together, and cooperating cam surfaces on the said bolt and one of the said members, which cam surfaces engage when the bolt is projected whereby when one of the said members is rotated the torque is transmitted through the said cam surfaces and bolt from one rotatable member to the other.

10. In combination with two members one of which is relatively rotatable within the other, a reciprocable bolt, a transverse guideway in one of said members in which the bolt reciprocates and is loosely guided to permit canting of the bolt in the guideway, the end of the bolt and one if the said rotatable members having mutually engageable concentric locking surfaces, means for projecting the bolt outwardly along the guideway beyond the circumference of the rotatable member having the said guideway to engage the locking surfaces of said bolt and the other of said rotatable members to lock the said members together, a cam face on the bolt and a cam face on the said rotatable member having the guideway which cam faces, when the bolt is projected, engage and cooperate with the tilting action of the bolt to increase the resistance to relative rotation of the two members as the force tending to rotate the one about the other increases.

PORTER E. STONE.